US008554392B2

(12) United States Patent
Dal Santo

(10) Patent No.: US 8,554,392 B2
(45) Date of Patent: Oct. 8, 2013

(54) METHOD AND DEVICE TO ASSIST IN THE DRIVING OF A VEHICLE, IN PARTICULAR OF AN AIRCRAFT, FOR THE AVOIDANCE OF OBSTACLES

(75) Inventor: Xavier Dal Santo, Blagnac (FR)

(73) Assignee: Airbus Operations SAS, Toulouse (FR)

( * ) Notice: Subject to any disclaimer, the term of this patent is extended or adjusted under 35 U.S.C. 154(b) by 877 days.

(21) Appl. No.: 12/493,950

(22) Filed: Jun. 29, 2009

(65) Prior Publication Data

US 2010/0174425 A1 Jul. 8, 2010

(30) Foreign Application Priority Data

Jul. 1, 2008 (FR) ...................................... 08 03714

(51) Int. Cl.
*G05D 1/00* (2006.01)
*G05D 3/00* (2006.01)
*G06F 17/00* (2006.01)

(52) U.S. Cl.
USPC .............. 701/11; 701/3; 701/4; 701/5; 701/6; 701/8; 701/10; 701/301

(58) Field of Classification Search
USPC .......... 701/4, 5, 6, 8, 11, 301, 3, 10; 340/961, 340/963, 970
See application file for complete search history.

(56) References Cited

U.S. PATENT DOCUMENTS 6,208,270 B1 * 3/2001 Dunn ............................ 340/961
6,380,870 B1 * 4/2002 Conner et al. ................ 340/970
6,546,338 B2 * 4/2003 Sainthuile et al. ............ 701/301
6,675,095 B1 * 1/2004 Bird et al. ...................... 701/301
6,718,236 B1 * 4/2004 Hammer et al. .................. 701/3
6,963,291 B2 * 11/2005 Holforty et al. .............. 340/945
7,030,780 B2 * 4/2006 Shiomi et al. ................. 340/961
7,061,401 B2 * 6/2006 Voos et al. .................... 340/961
7,714,744 B1 * 5/2010 Wichgers ....................... 340/965
8,090,525 B2 * 1/2012 Villiers ......................... 701/120
2002/0152029 A1 * 10/2002 Sainthuile et al. ............ 701/301
2004/0239529 A1 * 12/2004 Tran .............................. 340/961
2008/0288169 A1 * 11/2008 Meunier et al. ............... 701/301

OTHER PUBLICATIONS

Robert Holdsworth, Jim Lambert, and Norbert Harle "Inflight Path Planning Replacing Pure Collision Avoidance, using ADS-B" IEEE AES Systems Magazine, Feb. 2001.*

Preliminary Search Report dated Jan. 22, 2009 w/ English translation.

R. Holdsworth et al., "Inflight Path Planning Replacing Pure Collision Avoidance, using ADS-B." IEEE, Aerospace and Electronic Systems Magazine, vol. 16, No. 2, Feb. 1, 2001 pp. 27-32.

(Continued)

*Primary Examiner* — Khoi Tran
*Assistant Examiner* — Jorge Peche
(74) *Attorney, Agent, or Firm* — Dickinson Wright PLLC

(57) ABSTRACT

A method and device for assisting in driving a vehicle in motion along an initial trajectory, in an environment containing at least one obstacle, assistance is carried out by checking, by a trajectory checking unit, during movement of the vehicle, the existence of at least one condition for modifying the initial trajectory to avoid the obstacle. A criteria determining unit is used to determine a criterion CR by which to avoid the obstacle, and an avoidance trajectory determining unit is used to determine an avoidance trajectory according to a derivative of the criterion CR. The vehicle is assisted along the determined avoidance trajectory by a driving assist device.

10 Claims, 3 Drawing Sheets

(56) References Cited

OTHER PUBLICATIONS

A. Miura et al., "Aircraft Collision Avoidance with Potential Gradient—Ground-Basedavoidance for Horizontal Maneuvers," Electronics & Communications in Japan, Part III—Fundamentalelectronic Science Wiley, Hoboken, NJ, US, vol. 78, No. 10, Oct. 1, 1995 pp. 104-113.

M. Christodoulou et al., "Nonlinear mixed integer programming for aircraft collision avoidance in free flight," IEEE, Electrotechnical Conference, 2004. MELECON 2004, Proceedings of the 12 th IEEE Mediterranean Dubrovnik, Croatia May 12-15, 2004, Piscataway, NJ, USA, vol. 1, May 12, 2004 pp. 327-330.

C. Carbone et al., "A Novel 3D Geometric Algorithm for Aircraft Autonomous Collision Avoidance," IEEE, Decision and Control, 2006 45th IEEE Conference on IEEE PI, Dec. 1, 2006 pp. 1580-1585.

J. Jackson, et al., "Curved Path Approaches and Dynamic Interpolation," IEEE Proceedings of the Digital Avionics Systems Conference, Virginia Beach, VA, USA, vol. Conf. 9, Oct. 15, 1990 pp. 404-408.

* cited by examiner

METHOD AND DEVICE TO ASSIST IN THE DRIVING OF A VEHICLE, IN PARTICULAR OF AN AIRCRAFT, FOR THE AVOIDANCE OF OBSTACLES

FIELD OF THE INVENTION

The present invention relates to a method and a device to assist in the driving of a vehicle moving along a trajectory, in an environment containing at least one obstacle.

BACKGROUND OF THE INVENTION

In the context of the present invention:

- said vehicle can correspond to any type of vehicle that is likely to move on the ground and/or in the air; and
- said obstacle, which can immaterially be a fixed element, in particular a building, or a moving object such as another vehicle for example, must be able to be avoided by said vehicle, and with a predetermined safety margin.

More particularly, although not exclusively, the present invention applies to an aircraft, in particular a transport airplane, which is approaching an airport in order to land or is moving away after a take-off.

The avoidance maneuvers considered in the present invention are therefore phases presenting high safety risks, due in particular to the proximity of one or more obstacles. Aggravating factors can be added to the criticality of this situation, such as poor environmental conditions or reduced maneuverability of the vehicle, which make it difficult to drive and which increase the risk of collision.

Currently, on transport airplanes in particular, there are onboard collision prevention systems which ensure that a safety distance is maintained between the airplane and an obstacle. However, the avoidance trajectories proposed by these usual prevention systems are not optimal in particular when it comes to the deviation (in terms of space and time) relative to the trajectory initially followed by the airplane.

Carrying out an avoidance maneuver of excessive amplitude can in particular lead to two types of major problems, namely:

- excessively increasing the time needed for the vehicle to reach its destination. This can in particular be quantified in compensation cost in the case of paying transportation of goods or passengers; and
- making it necessary to apply an additional maneuver to avoid a second obstacle that did not initially present any danger. The badly performed avoidance of a first obstacle leads in this case to a new risk of collision with the second obstacle.

Furthermore, in order to prevent emergency situations, such as, for example, a failure of a piloting for driving) system of the vehicle, a minimum safety separation with the obstacle must be ensured.

Moreover, the avoidance trajectory can be subject to external constraints such as performance limitations of the vehicle or traffic and movement rules in the environment.

The object of the present invention is to remedy the abovementioned drawbacks. It relates to a method for assisting in the driving of a vehicle in motion, in particular an aircraft and in particular a transport airplane, which is moving (on the ground or in flight) along an initial trajectory, in an environment containing at least one obstacle, fixed or moving, which must be avoided.

To this end, according to the invention, said method is noteworthy in that the following successive sequence of operations is carried out automatically and repetitively:

A/ a check is carried out, while the vehicle is moving, to see if at least one condition for modifying the trajectory because of an obstacle is fulfilled; and B/ if such a condition is fulfilled:

- a) a criterion is determined which depends on at least some of the following parameters:
  - a risk of collision with the obstacle;
  - spatial deviation from the initial trajectory; and
  - time remaining before reaching a planned destination;
- b) information is determined, at least from the current position of the obstacle and from the current position of the vehicle, relating to an avoidance trajectory that makes it possible to minimize said criterion and that is such that, when it is followed by said vehicle, it enables said vehicle to avoid said obstacle while reaching the planned destination; and
- c) said information for example, control instructions for control means, in particular control surfaces of an aircraft) relative to the avoidance trajectory is used to assist in the driving of the vehicle.

Thus, thanks to the invention, an optimum avoidance trajectory is automatically determined which enables the vehicle to avoid an obstacle, while enabling it to reach a particular destination, and this optimum avoidance trajectory is used to assist in the driving of the vehicle, as specified hereinbelow. The method according to the invention thus remedies the abovementioned drawbacks, in particular by providing an avoidance trajectory that is optimal when it comes to the deviation (in terms of space and time) relative to the trajectory initially followed by the vehicle.

Furthermore, since this method is implemented at least partially automatically, the workload of the pilot or pilots is not increased.

SUMMARY OF THE INVENTION

Furthermore, as specified hereinbelow, the invention makes it possible to indicate to the pilot, throughout the avoidance, the appropriate maneuver in order to both circumvent the obstacle and deviate as little as possible from the initial trajectory. Said device (which is therefore a trajectory indicator) evaluates at each instant the effect of a modification of the trajectory and thereby informs the pilot (or an automatic piloting system) as to the best maneuver to be carried out or as to the time remaining before carrying out a corrective action.

The present invention can be applied to any type of vehicle likely to be moving in space (on the ground or in flight), and in particular said initial trajectory and said avoidance trajectory can be flight trajectories or taxiing trajectories.

Advantageously, in step A/, a check is carried out to see if one of the following conditions is fulfilled:

- a minimum safety distance is not observed relative to the obstacle; and
- at least one traffic rule in the environment is not observed.

Furthermore, in a preferred embodiment, in the step B/a), said criterion CR is calculated using the following expression:

$$CR=R^2+a1\cdot D^2+a2\cdot T^2$$

in which:

- R is an evaluation of a risk of collision with the obstacle;
- D is an evaluation of a deviation relative to the initial trajectory;
- T is the time needed to rejoin this initial trajectory; and
- a1 and a2 are weighting values determined empirically.

Moreover, advantageously:

in the step B/b), a value E is determined which verifies the following equation:

$$E=\partial CR/\partial s\partial q$$

in which:

s is a curvilinear abscissa of the vehicle along the initial trajectory;

q represents a turn parameter of a control element of the vehicle, for example a control surface in the case of an aircraft, used to modify said initial trajectory so as to follow said avoidance trajectory; and E represents the derivative of the criterion CR in relation both to said curvilinear abscissa s and to said turn parameter q;

in the step B/b), values of the turn parameter q are determined for which said value E is zero; and in the step B/c), the duly determined values are used to assist in the driving of the vehicle.

Furthermore, advantageously, in the step B/c):

in a first embodiment, at least one indication means indicating said avoidance trajectory is presented to the pilot of the vehicle on a display system; and in a second embodiment, an automatic piloting system guides the vehicle automatically along said avoidance trajectory.

The present invention also relates to a device to assist in the driving of a vehicle in motion, in particular an aircraft and notably a transport airplane, which is moving (on the ground or in flight) along an initial trajectory, in an environment containing at least one fixed or moving obstacle, which must be avoided.

According to the invention, said device is noteworthy in that it comprises:

means for checking whether, while the vehicle is moving, at least one condition for modifying the initial trajectory (because of an obstacle) is fulfilled;

means for determining, when such a condition is fulfilled, a criterion which depends on at least some of the following parameters:

risk of collision with an obstacle;

spatial deviation from the initial trajectory; and time remaining before reaching a planned destination;

means for determining, at least from the current position of the obstacle and from the current position of the vehicle, information relating to an avoidance trajectory with which to minimize said criterion and which is such that, when it is followed by said vehicle, it enables it to avoid said obstacle while reaching the planned destination; and means, for example a display system and/or an automatic piloting system, that use said information (for example, control instructions for control means such as control surfaces) which relate to the avoidance trajectory, to assist in the driving of the vehicle.

The driving assistance device according to the invention therefore enables a pilot (or an automatic piloting system) to control the trajectory (in flight or taxiing) of a vehicle, which is moving in an environment containing obstacles, the avoidance of these obstacles being necessary to ensure the safety of said vehicle, an obstacle possibly being immaterially a fixed element of the environment or another vehicle.

The present invention also relates to a vehicle, in particular an aircraft and notably a transport airplane, which includes a driving assistance device such as that mentioned above.

BRIEF DESCRIPTION OF THE DRAWINGS

The figures of the appended drawing will give a clear understanding of how the invention can be implemented. In these figures, identical references designate similar elements.

DETAILED DESCRIPTION OF THE INVENTION

Figure 1:
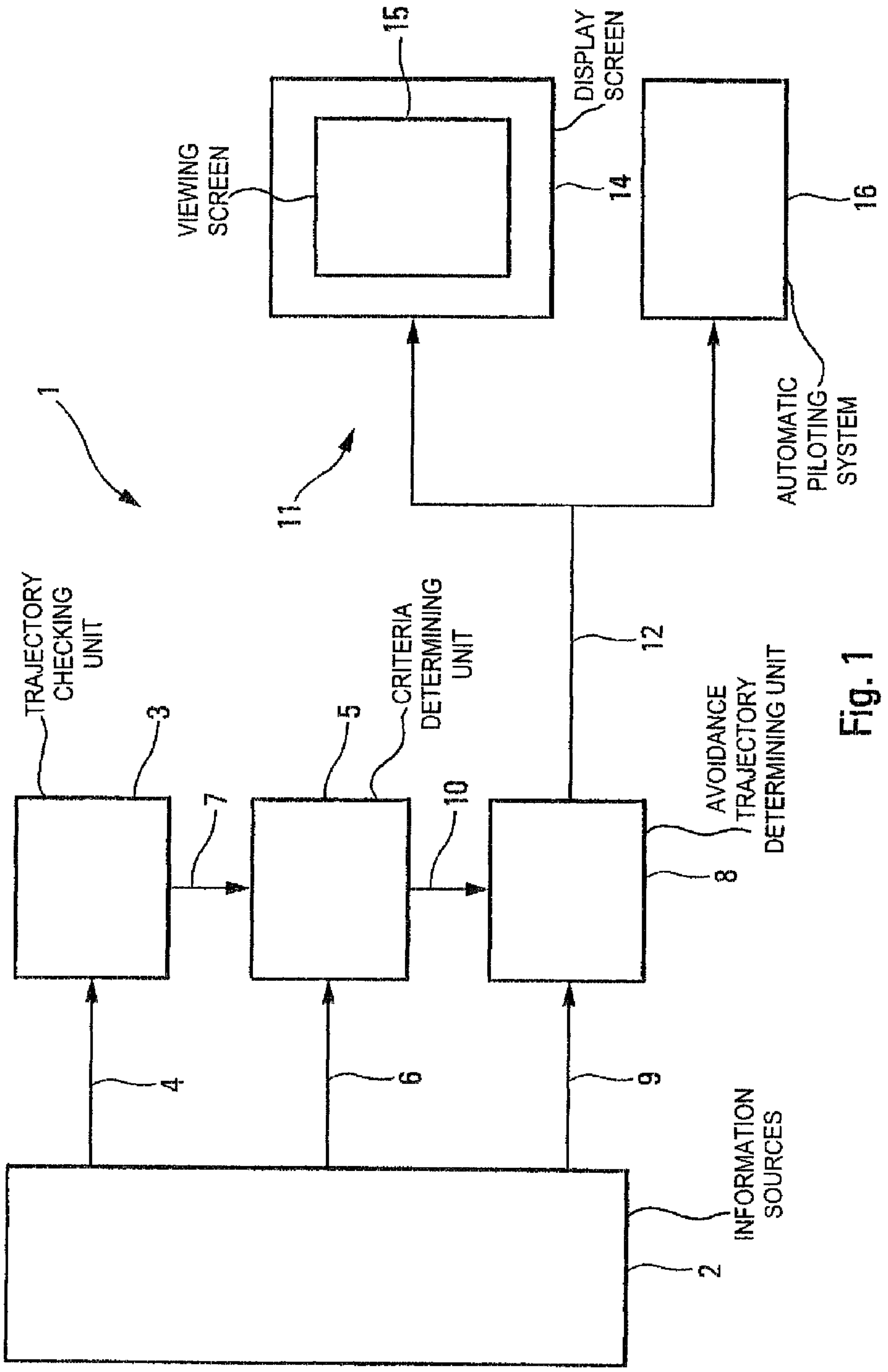
FIG. 1 is the block diagram of a device to assist in the driving of a vehicle, according to the invention.

The device 1 according to the invention and diagrammatically represented in FIG. 1 is intended to be mounted on any vehicle A which is likely to move on the ground or in the air. Although not exclusively, this vehicle A is preferably an aircraft, in particular a transport airplane.

The object of said device 1 is to assist in the driving of the vehicle A which is moving (on the ground or in flight) along an initial trajectory TI, in an environment containing at least one obstacle, fixed or moving, which must be avoided. In the context of the present invention, said obstacle can be immaterially a fixed element, in particular a building, or a moving object such as another vehicle for example, which must therefore be avoided by said vehicle A with a particular safety margin.

According to the invention, said device 1 which is on board the vehicle A comprises, as shown in FIG. 1:

a set 2 of information sources that can, in the usual way, determine the current values of parameters associated with the vehicle A and its environment. Said set 2 determines, in particular, the current position of the vehicle A, its speed, its direction of movement, the current positions of the obstacles, their speed, their direction of movement, and any other useful information concerning the environment of the vehicle A;

means 3 that are linked via a link 4 to said set 2 and that are formed in such a way as to check whether, while the vehicle A is moving, at least one condition for modifying the initial trajectory TI is fulfilled. This condition specified hereinbelow may depend on an obstacle;

means 5 that are linked via links 6 and 7 respectively to said set 2 and to said means 3 and that are formed in such a way as to determine, when such a condition is fulfilled, a criterion CR that depends on at least some of the following parameters:

a risk of collision with an obstacle;

a spatial deviation from the initial trajectory TI; and a time remaining before reaching a planned destination;

means 8 that are linked via links 9 and 10 respectively to said set 2 and to said means 5 and that are formed in such a way as to determine, at least from the current position of the obstacle and from the current position of the vehicle A, received from said set 2, information relating to an avoidance trajectory TE that minimizes said criterion CR (received from said means 5) and that is such that, when it is followed by said vehicle A, it enables it to avoid said obstacle while reaching the planned destination; and means 11, specified hereinbelow, that are linked via a link 12 to said means 8 and that are formed in such a way as to use said information (for example control instructions for control means, in particular control surfaces of an aircraft) relating to the duly determined avoidance trajectory TE, to assist in the driving of the vehicle A.

Said means 3 comprise integrated elements (not represented) to check whether one of the following conditions is fulfilled:

a minimum safety distance is not observed in relation to the obstacle; and at least one traffic rule in the environment is not observed.

Furthermore, in a particular embodiment, said means 5 comprise integrated elements (not represented) for calculating the criterion CR, using the following expression:

$$CR=R^2+a1\cdot D^2+a2\cdot T^2$$

in which:

R is an evaluation of the risk of collision with the obstacle;

D is an evaluation of the current deviation of the vehicle A from the initial trajectory TI;

T is the time needed for said vehicle A to rejoin, from its current position, this initial trajectory TI that it has left to avoid an obstacle; and a1 and a2 are weighting values.

The weighting values a1 and a2 are chosen empirically, so that the terms $a1\cdot D^2$ and $a2\cdot T^2$ remain positive and less than 1 for all the avoidance maneuvers that can be envisaged.

Said criterion CR is evaluated repetitively, and it evolves when a piloting action is performed. The mathematical formula for calculating this criterion CR is preferably adapted to the real situation of movement of the vehicle A and in particular to the type of trajectory, to the type of obstacle, to the type of vehicle and/or to the desired safety level.

Consequently, the device 1 according to the invention automatically determines an avoidance trajectory TE that enables the vehicle A to avoid an obstacle, while enabling it to reach a particular destination, and it uses this trajectory TE to assist in the driving of the vehicle A.

To do this, said means 11 can include:

a display system 14 for presenting, on a usual viewing screen 15, to a pilot of the vehicle A, at least one indication means (not represented) indicating said avoidance trajectory TE or said above-mentioned information relating to the avoidance trajectory TE; and/or a usual automatic piloting system 16 which guides the vehicle A, automatically, along said avoidance trajectory TE. This automatic piloting system 16 comprises, in the usual manner, an automatic pilot which determines, using received information (and in particular the above-mentioned information relating to the avoidance trajectory TE), piloting instructions that are applied to control means that can act on the motion of the vehicle A and also forming part of said system 16.

The device 1 according to the invention thus indicates to the pilot, throughout the avoidance, the appropriate maneuver for both circumventing the obstacle and deviating as little as possible from the initial trajectory TI. To do this, this trajectory indicator (device 1) evaluates, at each instant, the effect of a modification of the trajectory and, by this means, informs the pilot (or the automatic piloting system 16) as to the best maneuver to be carried out or as to the time remaining before carrying out a corrective action.

In observing this principle, the reasons for modifying the initial trajectory TI are, in order of priority:

failure to observe a minimum safety distance with an obstacle;

failure to observe traffic rules that are prescribed in the environment concerned, for example when approaching an airport; and passing of the best point to perform a corrective action.

The optimum avoidance trajectory TE is defined as that which minimizes the criterion CR, which increases with:

the risk of collision with the obstacle;

the spatial deviation from the initial trajectory TI; and the time remaining before reaching the destination.

In order to ensure a minimum deviation, the trajectory modification must take place at the most appropriate moment, that is, at the point of the future trajectory where the criterion CR will be minimized for an avoidance maneuver. Such a point is called "maximum sensitivity point" in the context of the present invention. The act of passing through maximum sensitivity points and applying the instructions specified hereinbelow at these points ensures that the avoidance carried out in this way as a whole will minimize said criterion CR. The maximum sensitivity points can be determined mathematically using the evaluation of the criterion CR.

If we use s to designate the curvilinear abscissa of the vehicle A on its current trajectory, and q to designate the turning of a control element of the vehicle A, for example of a control surface (lateral, direction or depth) of an aircraft in flight, which modifies the trajectory of the vehicle A, the maximum sensitivity points verify the following equation:

$$\partial CR/\partial s\partial q=0$$

For this:

said means 8 comprise elements for determining a value E which verifies the following equation:

$$E=\partial CR/\partial s\partial q$$

in which:

in which:

s is therefore the curvilinear abscissa of the vehicle A along the initial trajectory TI;

q therefore represents a turn parameter of at least one control element used to modify said initial trajectory TI so as to follow said avoidance trajectory TE; and E represents the derivative of the criterion CR in relation to both said curvilinear abscissa s and said turn parameter q;

said means 8 also comprise elements for determining values of the turn parameter q (in particular a turn angle), for which said value E is zero; and said means 11 use the values (of the turn parameter q) determined in this way, in conjunction with the corresponding curvilinear abscissi, to assist in the driving of the vehicle A.

The control elements of the vehicle A, which are actuated for the implementation of the invention, are those for which, at the maximum sensitivity point, the following applies:

$$\partial CR/\partial q=0$$

In the context of the present invention, said initial trajectory TI and said avoidance trajectory TE can be taxiing trajectories.

Figure 2:
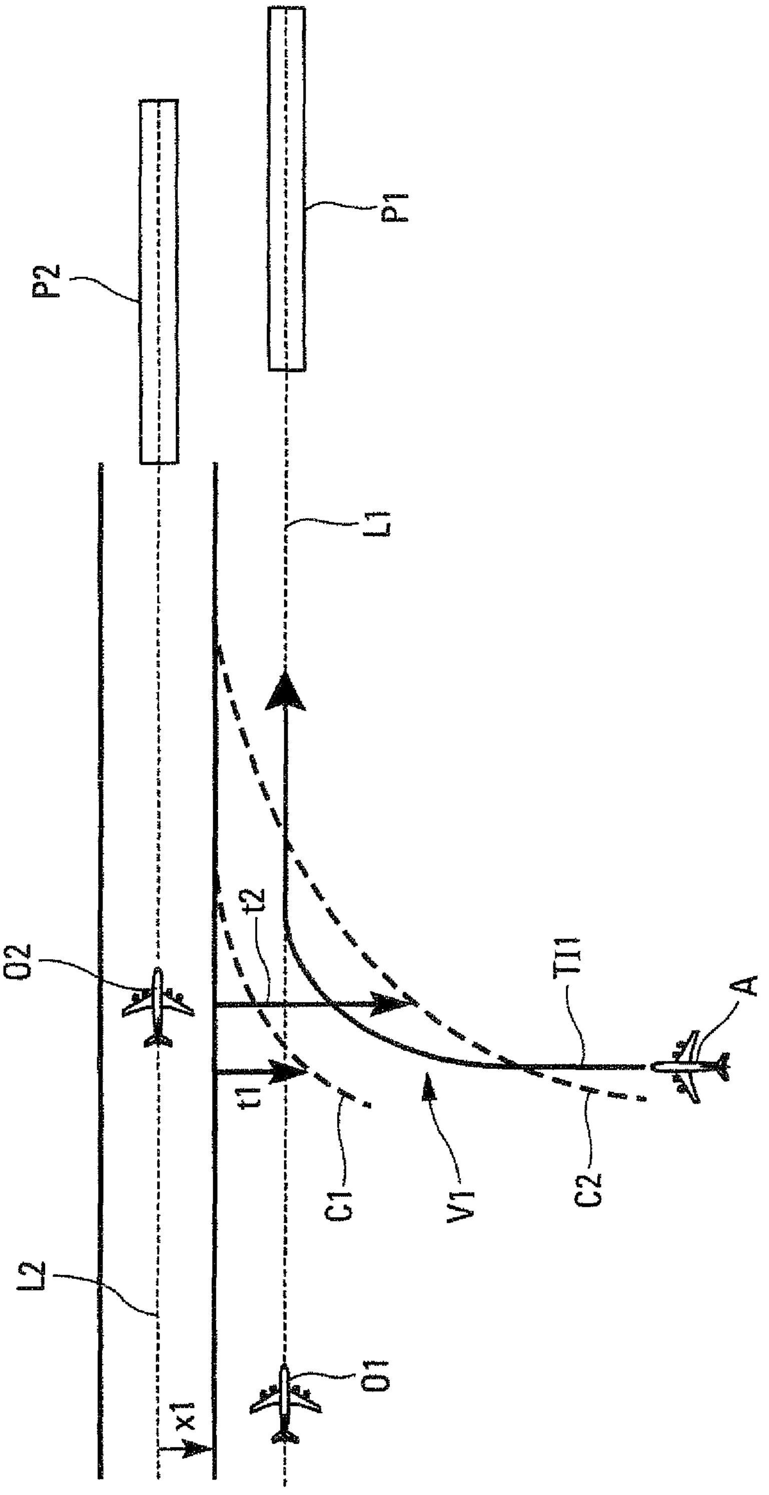
FIGS. 2 and 3 diagrammatically represent two airplane flight situations to which the present invention applies.
Figure 3:
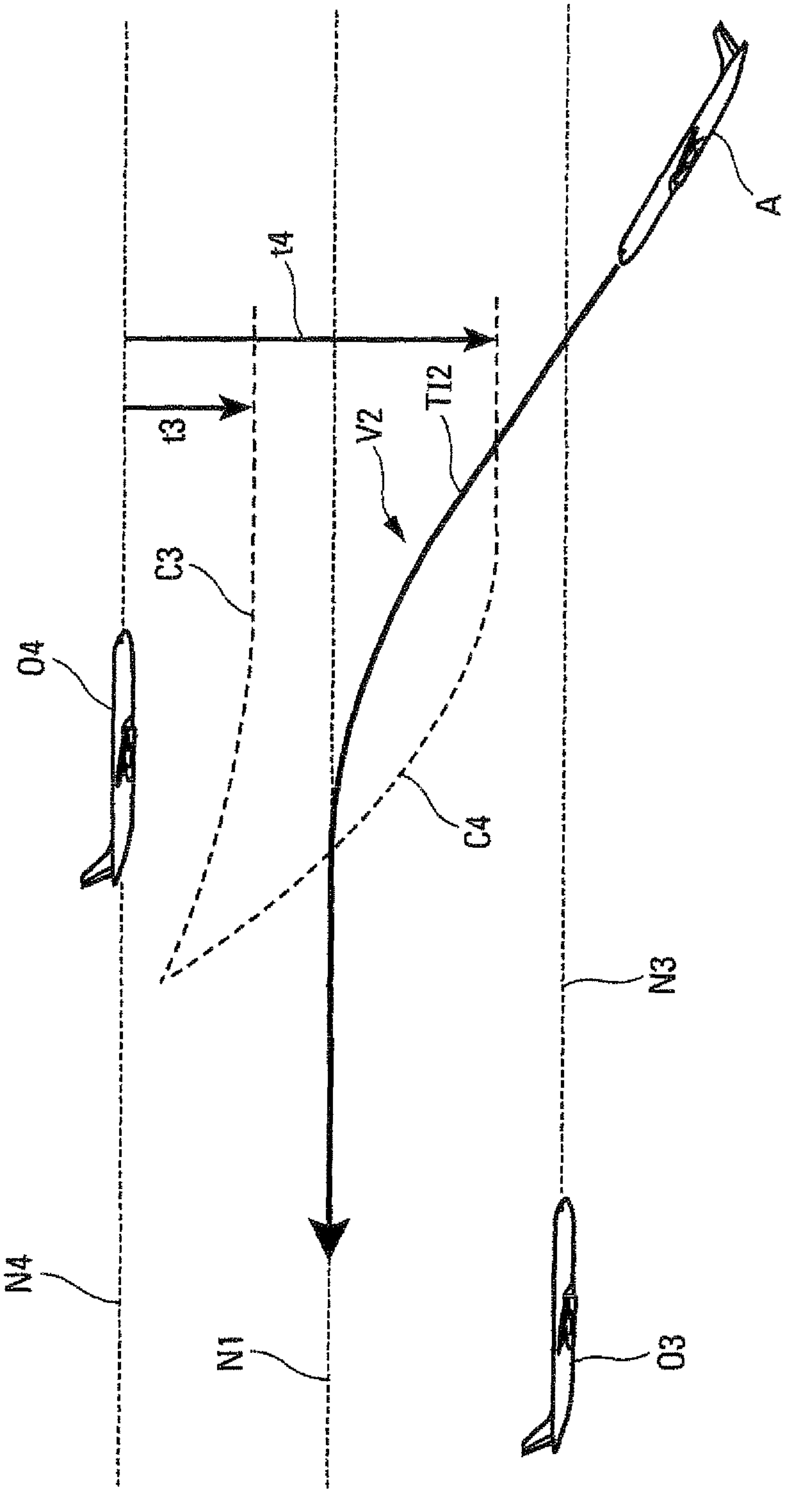

However, in a preferred embodiment, said initial trajectory TI and said avoidance trajectory TE are flight trajectories, and said vehicle A is an aircraft, in particular a transport airplane, as represented in FIGS. 2 and 3.

The detailed description of the preferred embodiment of the invention of FIGS. 2 and 3 applies to a transport airplane that is moving in an environment with dense air traffic.

A first variant embodiment of the invention (in its preferred mode) relates to airport approaches where the space for the movements in the horizontal plane is restricted, as represented in FIG. 2 which shows an approach to an airport with movement constraints.

The overall problem that exists for the situation of FIG. 2 can be summarized as follows:

- the vehicle A is therefore a transport airplane approaching an airport. This airplane A must be maneuvered to the left or to the right, manually by a pilot using usual controls or automatically by the automatic piloting system 16. In this case, it must be maneuvered to the right, to reach, along an initial trajectory TI1, the axis L1 of a runway P1, in order for it to land;
- the environment of the airplane A contains two obstacles, namely two other airplanes O1 and O2 that are also approaching this airport. The airplane O1 must also reach the runway P1, and it is laterally situated on the axis L1 which represents the corresponding approach axis, but upstream in relation to the airplane A. The airplane O2 must reach a runway P2 of axis L2, and it is already laterally situated on this axis L2 which represents the corresponding approach axis;
- traffic rules 4 in the vicinity of the airport) are provided. Each airplane must avoid any risk of near miss by following, at all times:
  - a trajectory that does not converge with that of another airplane in less than t1 seconds, which is illustrated in FIG. 2 by a curve C1 between the airplanes A and O2; and
  - a position deviation of x1 meters with any other airplane;
- safety objectives are provided. According to these safety objectives, the traffic rules must be observed by increasing the convergence time to a time t2 which is such that t2>t1, which is illustrated in FIG. 2 by a curve C2 between the airplanes A and O2;
- the trajectory TI1 initially provided for the airplane A is a direct approach with alignment on the axis L1 of the runway P1 in a single turn V1; and
- there are performance limitations affecting the airplane A, the turn radius of the airplane A being limited to a lower value.

The trajectory TI1 initially provided observes the traffic rules, but it may not observe the safety objectives. For this reason, this trajectory TI1 must be modified, which will have the effect of extending the insertion time of the airplane A on the approach axis L1. For traffic congestion reasons (arrival of the airplane O1 in particular), this additional time is limited. Compliance with this additional time limit makes it possible to avoid any risk of collision with the airplane O1.

The criterion CR1 taken into account in this situation is proportional to the square of the following values:

- the convergence time with the airplane O2, called tc1; and
- the total insertion time on the approach axis L1, called ti1.

A weighting ai1 is applied only to the second term, and it varies according to the approach speed of the airplane A.

The following is therefore obtained:

$$CR1 = tc1^2 + ai1 \cdot ti1^2$$

The indications of the avoidance trajectory TE1 are, in this case, in order of priority:

- to the right, with a minimum turn radius, if tc1<t1;
- straight ahead, if ti1 exceeds the additional time allowed; and
- to the right with the appropriate turn radius, at the maximum sensitivity point of the criterion CR1.

A second variant embodiment of the invention (in its preferred mode) concerns the capturing of flight levels where the movements in the vertical plane are restricted, as represented in FIG. 3 which shows flight levels being captured in the presence of dense air traffic.

The overall problem that exists for the situation of FIG. 3 can be summarized as follows:

- the vehicle A is a transport airplane that can be maneuvered upward or downward, by a pilot using usual controls or by an automatic piloting system 16. In the event, it must be maneuvered upward to reach a flight level N1, along an initial trajectory TI2;
- the environment of the airplane A contains two obstacles, namely two other airplanes O3 and O4 which are cruising around the required flight level N1, respectively at flight levels N3 and N4, N3 being less than N1 and N4 being greater than N1;
- traffic rules are provided. Each airplane must avoid any risk of near miss by following at all times a trajectory that does not converge with that of another airplane in less than t3 seconds, as represented in FIG. 3 by a curve C3 between the airplanes A and O4. To capture a flight level downward (respectively upward), only trajectory corrections downward (respectively upward) can be envisaged;
- safety objectives are provided. According to these safety objectives, the traffic rules must be observed by increasing the convergence time to a time t4 which is such that t4>t3, which is illustrated in FIG. 3 by a curve C4 between the airplanes A and O4;
- the trajectory TI2 initially provided is a direct approach with an alignment on the flight level N1 according to a parabolic trajectory V2; and
- there are performance limitations affecting the airplane A, the vertical acceleration of the airplane A being limited by a maximum value.

The criterion CR2 taken into account in this situation is proportional to the square of the following values:

- the convergence time with the airplane O4, called tc2;
- the overall insertion time on the flight level N1, called ti2.

A weighting ai1, which is applied only to the second term, varies according to the vertical speed of the airplane A at the time of the start of the avoidance maneuver.

The following is therefore obtained:

$$CR2 = tc2^2 + ai2 \cdot ti2^2$$

The indications of the avoidance trajectory TE2 are, in this case, in order of priority:

- downward with a maximum vertical acceleration, if t2$c$<t3;
- straight ahead, if ti2 exceeds the additional time allowed; and
- downward with the appropriate vertical acceleration, at the maximum sensitivity point of the criterion CR2.

The invention claimed is:

1. A method to assist in driving a vehicle moving along an initial trajectory, in an environment containing at least one obstacle to be avoided, the method comprising the steps of:

A/ checking, by a trajectory checking unit, during movement of the vehicle along the initial trajectory, in the environment containing the at least one obstacle to be avoided, the existence of at least one condition for modifying the initial trajectory of the vehicle;

B/ determining:

a) by a criteria determining unit, a criterion CR by which to avoid the at least one obstacle, wherein the criterion CR is determined according to the following expression:

$$CR = R^2 + a1 \cdot D^2 + a2 \cdot T^2$$

in which:

R is an evaluation of a risk of collision with the at least one obstacle;

D is an evaluation of a deviation relative to the initial trajectory;

T is time needed to rejoin the initial trajectory; and a1 and a2 are weighting values; and b) by an avoidance trajectory determining unit, an avoidance trajectory according to a value E wherein:

$$E=\partial CR/\partial s\partial q$$

in which:

s is a curvilinear abscissa of the vehicle moving along the initial trajectory;

q represents a turn parameter of a control element that controls the vehicle (to follow said avoidance trajectory; and E represents a derivative of the criterion CR in relation both to said curvilinear abscissa s and to said turn parameter q;

wherein said avoidance trajectory determining unit further determines values of the turn parameter q for which said derivative value E is zero, said turn parameter values being incorporated into the determination of the avoidance trajectory in which the vehicle reaches a planned destination while avoiding said at least one obstacle; and C/ assisting the driving of the vehicle by a driving assist device along the determined avoidance trajectory according to the determined values of the turn parameter in conjunction with the corresponding curvilinear abscissi.

2. The method as claimed in claim 1, wherein, in the step A/, the checking is carried out to determine the existence of at least one of the following conditions:

a minimum safety distance is not observed relative to the at least one obstacle; and at least one traffic rule in the environment is not observed.

3. The method as claimed in claim 1, wherein a plurality of control elements of the vehicle are provided with which to modify the initial trajectory and said control elements are actuated in accordance with the determined criterion CR and the turn parameter q such that:

$$\partial CR/\partial q=O.$$

4. The method as claimed in claim 3, wherein said vehicle is an aircraft, and wherein said control elements include at least one control surface of the aircraft.

5. The method as claimed in claim 1, wherein, in the step C/, at least one indication representing said avoidance trajectory is presented to a pilot of the vehicle on a display system.

6. The method as claimed in claim 1, wherein, in the step C/, an automatic piloting system assists in the driving of the vehicle along said avoidance trajectory.

7. The method as claimed in claim 1, wherein said initial trajectory and said avoidance trajectory are flight trajectories.

8. The method as claimed in claim 1, wherein said initial trajectory and said avoidance trajectory are taxiing trajectories.

9. A device to assist in piloting a vehicle moving along an initial trajectory, in an environment containing at least one obstacle to be avoided, said device comprising:

trajectory checking unit configured to check, during movement of the vehicle along the initial trajectory, in the environment containing the at least one obstacle to be avoided, the existence of at least one condition for modifying the initial trajectory of the vehicle;

criterion determining unit configured to calculate a criterion CR by which to avoid the at least one obstacle, wherein the criterion CR is determined according to the following expression:

$$CR=R^2+a1\cdot D^2+a2\cdot T^2$$

in which:

R is an evaluation of a risk of collision with the at least one obstacle;

D is an evaluation of a deviation relative to the initial trajectory;

T is time needed to rejoin the initial trajectory; and a1 and a2 are weighting values;

avoidance trajectory determining unit configured to determine an avoidance trajectory according to a value E in which:

$$E=\partial CR/\partial s\partial q$$

in which:

s is a curvilinear abscissa of the vehicle moving along the initial trajectory;

q represents a turn parameter of a control element that controls the vehicle to follow said avoidance trajectory; and E represents a derivative of the criterion CR relative both to said curvilinear abscissa s and to said turn parameter q;

wherein said avoidance trajectory determining unit further determines values of the turn parameter q, for which said derivative value E is zero, said turn parameter values being incorporated into the determination of the avoidance trajectory in which the vehicle reaches a planned destination while avoiding said obstacle; and driving assist device configured to receive the determined values of the turn parameter in conjunction with the corresponding curvilinear abscissa from the avoidance trajectory determining unit, and to assist driving of the vehicle along the determined avoidance trajectory.

10. An aircraft, which includes the device of claim 9.

* * * * *